(12) United States Patent
Fischel

(10) Patent No.: US 10,038,197 B2
(45) Date of Patent: Jul. 31, 2018

(54) ULTRALOW RESISTANCE ELECTRODES FOR ELECTROCHEMICAL CELLS

(71) Applicant: Halbert P. Fischel, Las Vegas, NV (US)

(72) Inventor: Halbert P. Fischel, Las Vegas, NV (US)

(73) Assignee: Global Energy Science, LLC, Santa Barbara, CA (US)

( * ) Notice: Subject to any disclaimer, the term of this patent is extended or adjusted under 35 U.S.C. 154(b) by 132 days.

(21) Appl. No.: 15/274,476

(22) Filed: Sep. 23, 2016

(65) Prior Publication Data

US 2017/0047591 A1 Feb. 16, 2017

Related U.S. Application Data

(60) Continuation-in-part of application No. 15/069,998, filed on Mar. 15, 2016, which is a division of
(Continued)

(51) Int. Cl.
*H01M 4/133* (2010.01)
*H01M 4/66* (2006.01)
(Continued)

(52) U.S. Cl.
CPC .......... *H01M 4/8626* (2013.01); *H01G 11/02* (2013.01); *H01G 11/04* (2013.01);
(Continued)

(58) Field of Classification Search
CPC ....... H01M 4/02–4/0497; H01M 4/13–4/1399; H01M 4/583–4/587; H01M 4/64–4/663; H01M 2/05–2/0587
See application file for complete search history.

(56) References Cited

U.S. PATENT DOCUMENTS 3,490,952 A   1/1970  Balaguer
3,930,094 A * 12/1975  Sampson ................ H01M 4/86
                                                          442/365
(Continued)

FOREIGN PATENT DOCUMENTS

CN   102306800 A   1/2012
JP   2015524991 A   8/2015
KR   20140048197 A  4/2014

OTHER PUBLICATIONS

International search report for patent application No. PCT/US2017/051739 dated Sep. 15, 2017.
(Continued)

*Primary Examiner* — Jonathan Crepeau
*Assistant Examiner* — Jacob Buchanan
(74) *Attorney, Agent, or Firm* — Bachman & LaPointe, P.C.

(57) ABSTRACT

An electrode for electrochemical cells comprising an electrically conductive surface; an electrically conductive porous membrane having a first surface and an opposed outer second surface separated from the first surface by a thickness dimension defined by the length of a vector normal to the first surface and extending to where the vector intersects the second surface of an uncompressed portion of membrane, the membrane first surface is adjacent the electrically conductive surface and not more than 10% of the membrane second surface includes an area comprising at least one of; being compressed with sufficient sustained force toward and embedded into the electrically conductive surface so that electrical resistance between a location within a compressed outer second surface and the conducting surface is less than 10 micro-ohm and wherein no point within an uncompressed area is further from a nearest
(Continued)

compressed area than three times the defined thickness dimension of the membrane.

22 Claims, 6 Drawing Sheets

Related U.S. Application Data application No. 14/717,139, filed on May 20, 2015, now Pat. No. 9,337,474.

(60) Provisional application No. 62/086,836, filed on Dec. 3, 2014.

(51) Int. Cl.

| | | |
|---|---|---|
| H01G 11/32 | (2013.01) | |
| H01G 11/24 | (2013.01) | |
| H01M 4/86 | (2006.01) | |
| H01G 11/26 | (2013.01) | |
| H01G 11/36 | (2013.01) | |
| H01G 11/46 | (2013.01) | |
| H01G 11/40 | (2013.01) | |
| H01G 11/02 | (2013.01) | |
| H01G 11/04 | (2013.01) | |
| H01G 11/28 | (2013.01) | |
| H01G 11/52 | (2013.01) | |
| H01G 11/70 | (2013.01) | |
| H01M 4/96 | (2006.01) | |

(52) U.S. Cl.
CPC .............. *H01G 11/24* (2013.01); *H01G 11/26* (2013.01); *H01G 11/28* (2013.01); *H01G 11/36* (2013.01); *H01G 11/40* (2013.01); *H01G 11/46* (2013.01); *H01G 11/52* (2013.01); *H01G 11/70* (2013.01); *H01M 4/133* (2013.01); *H01M 4/663* (2013.01); *H01M 4/96* (2013.01); *Y02E 60/13* (2013.01)

(56) References Cited

U.S. PATENT DOCUMENTS

| | | | |
|---|---|---|---|
| 4,366,051 | A | 12/1982 | Fischel |
| 4,386,987 | A | 6/1983 | Covitch et al. |
| 4,654,104 | A * | 3/1987 | McIntyre ............. C25B 9/10 156/276 |
| 5,034,135 | A | 7/1991 | Fischel |
| 5,234,778 | A | 8/1993 | Wright |
| 5,376,263 | A | 12/1994 | Fischel |
| 5,955,215 | A | 9/1999 | Kurzweil et al. |
| 7,955,535 | B2 | 6/2011 | Liang et al. |
| 7,964,301 | B2 | 6/2011 | Fischel et al. |
| 7,971,489 | B2 | 7/2011 | Pushparaj et al. |
| 7,972,747 | B2 | 7/2011 | Fischel |
| 8,017,261 | B2 | 9/2011 | Halbert |
| 8,021,747 | B2 | 9/2011 | Yi et al. |
| 8,124,296 | B1 | 2/2012 | Fischel |
| 8,147,767 | B2 | 4/2012 | Fischel |
| 8,158,277 | B1 | 4/2012 | Fischel |
| 8,173,217 | B2 | 5/2012 | Shin et al. |
| 8,187,560 | B2 | 5/2012 | Fischel |
| 8,187,737 | B2 | 5/2012 | Fischel |
| 8,213,157 | B2 | 7/2012 | Wei et al. |
| 8,283,062 | B2 | 10/2012 | Fischel |
| 8,283,275 | B2 | 10/2012 | Heo et al. |
| 8,333,810 | B1 | 12/2012 | Meyyappan |
| 8,394,518 | B2 | 3/2013 | Fischel et al. |
| 8,415,012 | B2 | 4/2013 | Zheng et al. |
| 8,703,355 | B2 | 4/2014 | Zhang et al. |
| 8,911,893 | B2 | 12/2014 | Suppes |
| 8,951,697 | B2 | 2/2015 | Zhang et al. |
| 9,337,474 | B1 | 5/2016 | Fischel |
| 9,508,976 | B2 | 11/2016 | Herle |
| 9,698,396 | B2 | 7/2017 | Lee et al. |
| 2002/0022570 | A1 * | 2/2002 | Reynolds, III ........ C04B 35/536 502/101 |
| 2002/0180094 | A1 | 12/2002 | Gough et al. |
| 2004/0058249 | A1 | 3/2004 | Cai et al. |
| 2005/0104243 | A1 * | 5/2005 | Mercuri ................. C04B 35/536 264/69 |
| 2006/0172134 | A1 | 8/2006 | Ro et al. |
| 2007/0048594 | A1 | 3/2007 | Oh et al. |
| 2007/0148531 | A1 | 6/2007 | Yoshizawa et al. |
| 2008/0241685 | A1 | 10/2008 | Hinoki et al. |
| 2010/0086837 | A1 | 4/2010 | Asari et al. |
| 2010/0119932 | A1 | 5/2010 | Nakura et al. |
| 2010/0178543 | A1 | 7/2010 | Gruner et al. |
| 2011/0123866 | A1 * | 5/2011 | Pan ......................... H01M 2/16 429/221 |
| 2013/0017432 | A1 | 1/2013 | Roumi |
| 2013/0045413 | A1 | 2/2013 | Wang et al. |
| 2014/0317920 | A1 | 10/2014 | Vanderleeden et al. |
| 2015/0104714 | A1 | 4/2015 | Galande et al. |
| 2016/0204408 | A1 | 7/2016 | Herle |
| 2016/0240326 | A1 | 8/2016 | Fischel |
| 2017/0047591 | A1 | 2/2017 | Fischel |
| 2017/0062787 | A1 | 3/2017 | Fischel |
| 2017/0125829 | A1 | 5/2017 | Fischel |
| 2017/0173728 | A1 | 6/2017 | Fischel |

OTHER PUBLICATIONS

International search report for patent application No. PCT/US2017/051739 dated Dec. 22, 2017.
Laurencelle, F. et al, "Characterization of a Ballard MK5-E Proton Exchange Membrane Fuel Cell Stack", Fuel Cells, 1(1) , 2001, pp. 66-71.
Kim, J., Lee S-M., Srinivasan S. and Chamberlin C.E., (Aug. 1995), "Modeling of Proton Exchange Membrane Fuel Cell Performance with an Empirical Equation", Journal of the Electrochemical Society, vol. 142(8), pp. 2670-2674.
Koper, M., Ed., Fuel Cell Catalysis, Wiley (2009), Chapter 3, p. 70.
Newman, J., et al., "Electrochemical Systems" Wiley (2004), Chapter 22 and Table 11.1, p. 284.
Bagotsky, V.S., "Fundamentals of Electrochemistry", Wiley (2006), Chapter 4.4, pp. 60-61.
Conway, B.E., "Electrochemical Supercapacitors", Plenum (1999), Chapters 16, 17.
Gordon, M. and Suppes, G., "Convection Battery-Modeling, Insight, and Review", AIChE Journal, Aug. 18, 2013, vol. 59, No. 8, pp. 2833-2843.
Sassin, M. B. et al., "Redox Deposition of Nanoscale Metal Oxides on Carbon for Next-Generation Electrochemical capacitors", Accounts of Chemical Research (2013), vol. 46, No. 5, pp. 1062-1074.
Chung, H. T., et al., "Active and Stable Carbon Nanotube/Nanoparticle Composite Electrocatalyst for Oxygen Reduction", Nature Communications, May 28, 2013.
Gorlin, Y., and Jaramillo, T.F., A Bifunctional Nonprecious Metal Catalyst for Oxygen Reduction and Water Oxidation, JACS Communications, Sep. 14, 2010.
Wang, H., et al., "An Ultrafast Nickel-Iron Battery from Strongly Coupled Inorganic Nanoparticle/Nanocarbon Hybrid Materials", Nature Communications, Jun. 26, 2012.
Zou, X. et al. "Cobalt Embedded Nitrogen-Rich Nanotubes Efficiently Catalyze Hydrogen Evolution Reaction at All pH Values" Angewandte Chemie, (2014), 126, pp. 4461-4465.and Supporting Information.
Ma, X., et al., High Rate Micrometer Ordered LiNi0.5Mn1.5O4, Journal of the Electrochemical Society (2010), 157(8), pp. A925-A931.
Bockris. J.O. et al., Modern Electrochemistry, 2nd Edition, Kluwer Academic/Plenum. Chapter 13.5, pp. 1812-1813. (2000).
Goodenough, J. et al., "The Li-Ion Rechargeable Battery: A Perspective", Journal of the American Chemical Society, 2013, 135 (4), pp. 1167-1176.

(56) References Cited

OTHER PUBLICATIONS

Gaberscek M. et al, "The Importance of Interphase Contacts in Li Ion Electrodes: The Meaning of the High-Frequency Impedance Arc", Electrochemical and Solid-State Letters,(2008), vol. 11, pp. A170-A174.
Muenzel, V. et al., "A Comparative Testing study of Commercial 18650-Format Lithium-Ion Battery Cells", Journal. ECS, (2015), vol. 162, (8) A1592-A1600.
Evanoff, K. et al., "Ultra Strong Silicon-Coated Carbon Nanotube Nonwoven Fabric as a Multifunctional Lithium-Ion Battery Anode", American Chemical Society,(Oct. 17, 2012), vol. 6, No. 11, pp. 9837-9845.
International search report for patent application No. PCT/US2017/060278 dated Feb. 22, 2018.

\* cited by examiner

ULTRALOW RESISTANCE ELECTRODES FOR ELECTROCHEMICAL CELLS

CROSS-REFERENCE TO RELATED APPLICATION

This application is a Continuation-In-Part of U.S. patent application Ser. No. 15/069,998, which is a Divisional of U.S. patent application Ser. No. 14/717,139, now U.S. Pat. No. 9,337,474, which claims priority from Provisional Patent Application Ser. No. 62/086,836, and which is also incorporated herein by reference.

BACKGROUND

The present disclosure is directed to electrodes for galvanic electrochemical cells (cells that produce direct current, D.C. electricity from stored chemical energy) for secondary (rechargeable) batteries that store redox chemical energy by cycling molecular valence contained within faradaic material coatings of graphene structures (e.g. carbon nanotubes, CNT) or within faradaic particles entrained within such structures particles to produce or accept D.C. electricity, fuel cells that catalytically convert hydrogen or hydrocarbon fuels and oxygen to D.C. electricity, oxygen breathing secondary batteries and capacitors that store D.C. electrical energy as charges on and/or in surfaces.

Batteries have for many years continuing to the present day used pastes comprising active faradaic particles, carbon powder additives for charge conduction and exchange with metal and binders, usually PTFE suspension, to durably coat the material onto separators that keep polar electrodes from mutual contact or onto metal surfaces otherwise separated in a unit cell, defined as one pair of separated positive and negative electrodes. There have been may published advances in galvanic properties of particles used in rechargeable batteries but not in the architecture just described that uses them in pastes. Goodenough *The Li-Ion Rechargeable Battery: A Perspective, J. Am. Chem. Soc.,* 2013, 135 (4), pp 1167-1176, "Chemists are contributing to incremental improvements of the conventional strategy.[redacted] . . . while retaining a $Li^+$ conductivity $\sigma_{Li} > 10^{-3}$ S $cm^{-1}$ . . . ", i.e. Siemens/cm or $10^3$ $\Omega$-cm. 'Conventional' strategies use pastes having thickness of about 100 µm so electrode resistance is $\approx 10$ $\Omega$-$cm^2$ which means 10 ohms resisting the flow of electricity through 1 $cm^2$ of electrode area. It is understood that there are two main sources of this resistance. One is ohmic resistance to electron flow between surfaces where charge transfer is created and terminals required of any electrochemical cell. The second, in series with the first, relates to ion mobility and the kinetics of their obligatory 'flow' between electrodes in batteries and fuel cells. This also appears as resistance in impedance measurements.

Gaberscek, The Importance of Interphase Contacts in Li Ion Electrodes: Electrochem. Solid-State Lett., 11, A170 (2008), published a detailed study of resistance in the Li-ion battery confirming 10 ohm-$cm^2$ and attributing most of that to electric charge transfer to metal current collectors at low discharge or charge current where ion kinetics has less influence on measurable resistance. He disproves the commonly assumed strong influence of an SEI layer but shows increasing resistance with current density due to retarded ion mobility. Electrolyte contact with active faradaic sites accounts for much of ion barrier resistance. Membrane ion permeability and diffusion through electrolyte account for the remainder of ion mass transport impedance. These important details will be appreciated in further disclosure of the instant invention.

Li-ion cells show consistent real axis resistance of 50 m$\Omega$ (milliohm) for cells having $\approx 200$ $cm^2$ area electrodes. Again, that is 10 $\Omega$-$cm^2$ for the entire collection. $i^2R$ heat can be related to the difference in charging and discharge energy to estimate R as $\Omega$-$cm^2$:

$$R = (V_c - V_d)^* (Ah/g)/(i_d) 2(g/cm^2)$$

Where $(V_c - V_d)^*$ is average charge to discharge voltage differential and $i_d$ is the discharge current/gram of the particle. (Ah/g) is the measured capacity over the correlated voltage range. $V_c/V_r$ for very low charging current, where $V_r$ is battery rated open circuit voltage and influence of internal impedance is negligible, is an irreducible efficiency for most faradaic electrode couples. It can be as high as 97% to 98%. The $(V_c - V_d)$ decrement for useful discharge current produces a loss of efficiency due to resistance within the battery.

Published charge/discharge voltage profiles as a function of ampere-hour capacity can be used to compute resistance values associated with specific examples. Ma, *High Rate Micrometer Ordered $LiNi_{0.5}Mn_{1.5}O_4$, Journal of The Electrochemical Society,* 157 (8) A925-A931 (2010), tested High Rate Micrometer Ordered $LiNi_{0.5}Mn_{1.5}O_4$ spinel particles as advanced Li-ion cathode material in conventional paste form using unusually high concentration of carbon black and PTFE binder to limit electrode resistance for the purpose of extracting mass based energy density of the spinel; It was realized by using 15 wt.-% to as much as 65 wt.-% carbon black at the expense of volume energy storage density to remove, as much as possible, "rate limitations". Even so, resistance is still in the range of ½ to 1 ohm-$cm^2$. Commercial batteries cannot afford to focus on such a limited metric since value is more a matter of volumetric energy storage density. On that basis there is more emphasis on active material weight/volume at the expense of conductive additives to the paste. Their published charge/discharge profiles compute to 10 ohm-$cm^2$ as measured directly by Muenzel, Valentin et al., A Comparative Testing Study of Commercial 18650—Format Lithium-Ion Battery Cells, Journal. ECS, 162 (8) A1592-A1600 (2015), for additional confirmation. Consequently, actual commercially available batteries must use high electrode area, limited area current density (10 to 30 mA/$cm^2$), and limited discharge capacity, $\approx 2$ C and long recharge time due to low current density.

Capacitors that depend upon a surface ionic double layer (supercapacitors) involve ion migration within electrolyte but do not require ion exchange between electrode materials. Their chief source of resistance is electrical contact with a metal current collector or cell terminal which has a profound influence on power density and a more subtle influence on energy density. Paste coatings and more advanced nanostructured carbon layers on metal current collectors continue to suffer from contact resistance of about ½ ohm-$cm^2$ even as thin layers. Higher capacity is spread over large area similar to battery architecture. A method of attaching nanocarbon structures to metal surfaces of the instant invention provides uniquely high capacitance almost independent of layer thickness.

Prior art fuel cell electrodes continue to use membrane electrode assemblies (MEA) that depend upon solid state electrolyte ionomers, carbon and noble metal catalyst paste mixture coatings having both high ohmic and ion mass transport kinetic resistance. Separating membranes commonly used in prior art fuel cells have 10 times the ion flux permeability in the plane of the membrane than through it where it is needed. Very high resistance can be accorded to that fact alone. When added to ohmic resistance ordinary fuel cell current density is never much greater than ½ A/cm².

Most advanced materials combine carbon nanotubes, CNT or related graphene structures with nanoscale faradaic materials in batteries and pseudo-supercapacitors but a problem of effectively connecting these electrically with low ohmic resistance to current collectors or any metal surface persists in the prior art which shows no similar examples for fuel cells. Structures that compress pastes to secure them as bound to respective sides of separating membranes usually require the membrane to be selectively permeable to at least one of the ions that must be exchanged between electrodes for electrical current to flow. Such membranes tend to retard ion kinetics and are not completely reliable for use in repeated charge cycling. Electrode current density is further limited by diffusion characterized by time related parameters that vary inversely as the square of the diffusion path length and is the reason for typically thin electrodes and large electrode area. These compounding limitations become balanced for fuel cells at about ½ Amp/cm² or, in prior art batteries and supercapacitors, much less.

It must be noted that the current density limitation above described is not so much controlled, especially in fuel cells, by a Tafel slope and overvoltage characteristic of the Butler-Volmer equation but by the value of electrode exchange current density $i_o$, i.e. coefficient in that equation. Absent any other limitation, $i_o$ is a function of galvanic particle mass concentration more than chemical process limitations. Prior art mass concentration of active faradaic material per unit projected electrode area is related to metal coating thickness or faradaic material volume-%. It also depends upon the ratio of active material area exposed to electrolyte per unit projected electrode area. Some advanced and emerging galvanic particles, even in the size range of 0.1 to 10 μm have exposed area ratios comparable to nanoscale particles of similar net weight so their actual size is no longer much of a factor. In prior art, when these particles are applied to metal current collectors as paste coatings containing 5 to 55% of active material volume, the rest comprising carbon and binder, electrical resistance in the path between particle and metal increases with active particle volume and weight ratio. The relationship forces a limiting tradeoff between energy storage capacity and power density. It is resistance that limits area specific current density and useful $i_o$. One can design $i_o$ to reach 10 Amps/cm² but resistance of ½ ohm-cm² is what makes that impossible because the iR voltage loss exceeds the voltage produced.

High area concentration of SWCNT or MWCNT (single and multi-wall carbon nanotube) here designated CNT and other graphene structures can be grown or deposited on metal surfaces and coatable in some cases with faradaics in the most advanced materials. Discharge would be virtually resistance free but for the same problem that continues to plague batteries, namely, electrical resistance in a connection of CNT fiber ends to metal where they are ostensibly attached. Carbon structures attached as formed on metal tend to peel off due to volume change in the material when exposed to charge/discharge cycles in fixed electrolyte; which testifies to their feeble electrical connection when 'attached'; Asari, USPTO Pub. No.: US 2010/0086837 A1, Apr. 8, 2010. Even if attachment issues are addressed by scoring and compressing the CNT layer, electrical resistance remains.

An especially desirable material and one widely publicized as breakthrough technology for batteries and supercapacitors is single or multilayer graphene sheet, CNT precipitated as woven or nonwoven cohesive mats, i.e. pellicles on metal current collectors. These have been coated with both cathodic and anodic nanoscale faradaics on their graphene surfaces; potentially a very effective formulation for batteries if they could be attached to metal current collectors with less resistance. Gold coatings were used by Nano-Lab, www.nano-lab.com/buckypaper to improve electrical contact of cohesive non-woven CNT with metal but reported 0.1 Ω-cm².

There have not been reliable examples of high electrical current density or voltage in batteries, capacitors or most galvanic electrochemical cells in actual use. Heretofore, electrical current density (amp/cm²) in electrochemical cells that produce direct current electricity from stored chemical energy (batteries) or stored charge (capacitor) has been limited to substantially less than 0.1 amp/cm² referred to projected electrode area. The inventor has measured the resistance of many samples of these materials and finds it consistent with literature that deals with the subject to be about ¼ to ½ ohm-cm² also referred to the projected electrode net surface area. That means 1 amp/cm² will produce a loss of ¼ to ½ volt in cells that barely generate 1 volt. The relationship accounts for low current density being accepted as a universal barrier.

Asari US 2010/0086837 describes a method for scoring a surface layer of CNT's attached at one end to a metal surface for the purpose of preventing the layer from becoming detached from the metal because of charge/discharge cycling. CNT is grown (by a CVD process) attached at one end to the metal and used in this form as capacitor galvanic material. Both physical attachment and electrical connection remain problematical and this form is not used as a galvanic pellicle in this invention. Sassin, M. B. et al, *Redox Deposition of Nanoscale Metal Oxides on Carbon for Next-Generation Electrochemical Capacitors*, Accounts of Chemical Research, Oct. 26, 2011, uses it to show how strongly coupled asymmetric coatings of $MnO_2$ and Fe on the surfaces of the CNT can greatly increase pseudo-supercapacitance and charge voltage but CNT attachment to metal remains too unstable for acceptance as electrodes by industry.

SUMMARY

In accordance with the present disclosure, there is provided an electrode for electrochemical cells, the electrode comprising: an electrically conductive surface; an electrically conductive porous membrane having a first surface and an opposed outer second surface separated from the first surface by a thickness dimension defined by the length of a vector normal to the first surface and extending to where the vector intersects the second surface of an uncompressed portion of membrane wherein the membrane first surface is adjacent the electrically conductive surface and not more than 10% of the membrane second surface includes an area comprising at least one of, being compressed with sufficient sustained force toward and embedded into the electrically conductive surface so that electrical resistance between a location within a compressed outer second surface and the conducting surface is less than 10 micro-ohm and wherein no point within an uncompressed area is further from a nearest compressed area than three times the defined thickness dimension of the membrane.

In another and alternative embodiment, the electrically conductive porous membrane contains an electrolyte comprising at least one of aqueous acid or alkali, aprotic salt solution, molten carbonate, molten sulfur, gel formulations of solvated ions, any gel, liquid or molten formulation of electrolyte emerging for use in electrochemical cells and any combination thereof.

In another and alternative embodiment, the electrically conductive porous membrane comprises at least one of cohesive nonwoven single and multi-wall carbon nanotubes (CNT), single and multiple layers of woven CNT, one and multiple layers of graphene, single and multiple layers of cohesive nonwoven and woven carbon fiber, single and multiple layers of woven and cohesive nonwoven $TiO_2$ nanotubes and nanofiber and combinations thereof.

In another and alternative embodiment, the electrically conductive porous membrane has tensile strength≥2 MPa.

In another and alternative embodiment, the electrically conductive porous membrane is stable at temperatures less than 700 degrees C.

In another and alternative embodiment, the at least 15% of the electrically conductive porous membrane is comprised of a plurality of at least one of CNT's and graphene sheets having length dimension greater than three times the thickness dimension of the membrane.

In another and alternative embodiment, the electrically conductive porous membrane is neither cut nor penetrated by at least one of removable embedment tools and sustained compression means.

In another and alternative embodiment, the electrically conductive porous membrane is configured as a pellicle on and combined with the electrically conducting surface, the electrically conductive porous membrane and the electrically conducting surface are porous to 1 centipoise viscosity liquid with greater than 1 Darcy permeability when subjected to normal vector flow In another and alternative embodiment, wherein each uncompressed area of the electrically conductive porous membrane has a maximum thickness dimension that does not vary by more than 10% among all uncompressed areas.

In another and alternative embodiment, the thickness of the uncompressed areas of the electrically conductive porous membrane are from about 50 μm to about 1 mm.

In another and alternative embodiment, the electrically conductive porous membrane comprises a plurality of nanoscale surfaces coated with at least one of strongly coupled faradaic material comprising the positive electrode of a secondary battery or supercapacitor, strongly coupled faradaic material comprising the negative electrode of a secondary battery or supercapacitor, strongly coupled catalyst material to reduce oxygen comprising a positive electrode of a fuel cell and strongly coupled catalyst material for oxidizing hydrocarbon fuel or hydrogen comprising a negative electrode of a fuel cell.

In another and alternative embodiment, the electrically conductive porous membrane contains particles enclosable by a sphere of from about 0.5 to about 10 μm diameter that remain lodged and immobilized within the membrane when subject to electrolyte normal vector convective permeation of 1 cm/second.

In another and alternative embodiment, at least one of coatings and particles contained within the electrically conductive porous membrane comprise between 20% and 60% of membrane volume.

In another and alternative embodiment, a plurality of one of compressed and embedded areas are spaced apart to comprise a pattern of hexagonal uncompressed areas wherein, compression/embedded area centers are mutually separated by not more than 3 times the membrane thickness dimension and compression areas are enclosable by a circle of not more than 1.22 times the defined uncompressed membrane thickness dimension.

In another and alternative embodiment, a plurality of one of compressed and embedded areas are spaced apart to comprise a pattern of square uncompressed areas, wherein compression/embedded area centers are mutually separated by not more than 4.24 times the membrane thickness dimension; and compression areas are enclosable by a circle of not more than 1.5 times the defined uncompressed membrane thickness dimension.

In another and alternative embodiment, a plurality of one of compressed and embedded areas are spaced apart to comprise a pattern of 60° triangular uncompressed areas wherein, compression/embedded area centers are mutually separated by not more than 5.2 times the membrane thickness dimension and compression areas are enclosable by a circle of not more than 1.7 times the defined uncompressed membrane thickness dimension.

In another and alternative embodiment, two electrodes for a unit cell of an electrochemical cell, the electrodes comprising: a positive electrode for electrochemical cells; and a negative electrode for electrochemical cells, wherein respective outer second surfaces of uncompressed membrane positive and negative electrode portions are separated by a gap containing electrolyte; and wherein not more than 10% of respective outer second surfaces of positive and negative electrode membranes are one of compressed onto and embedded into their respective conducting surfaces.

In another and alternative embodiment, two electrodes for a unit cell of an electrochemical cell, the electrodes comprising: a positive electrode for electrochemical cells, and a negative electrode for electrochemical cells, wherein respective outer second surfaces of uncompressed membrane positive and negative electrode portions are separated by a gap containing electrolyte, and wherein the gap also contains one of an open window dielectric screen separating two square weave metal wire screens with windows of all three screens in axial alignment and a dielectric screen with villiform projections on both sides so that not more than 10% of respective outer second surfaces of positive and negative electrode membranes is compressed against their respective conducting surfaces.

In another and alternative embodiment, Two electrodes for a unit cell of an electrochemical cell, wherein conducting surfaces are metal sheets having opposing outer surfaces opposite their respective surfaces adjacent the membrane and the collective layers are placed under compression between respective outer metal surfaces of sufficient magnitude to reduce contact resistance between compressed membrane outer surfaces and metal to less than 10 microohm.

In another and alternative embodiment, the general applied pressure is at least 7,000 Newton/$cm^2$.

In another and alternative embodiment, the real axis impedance of the unit cell is less than $10^{-4}$ ohm-$cm^2$.

In another and alternative embodiment, the real axis impedance of the unit cell is less than $10^{-3}$ ohm-$cm^2$.

Other details of the electrode are set forth in the following detailed description and the accompanying drawing wherein like reference numerals depict like elements.

DETAILED DESCRIPTION

Figure 1:
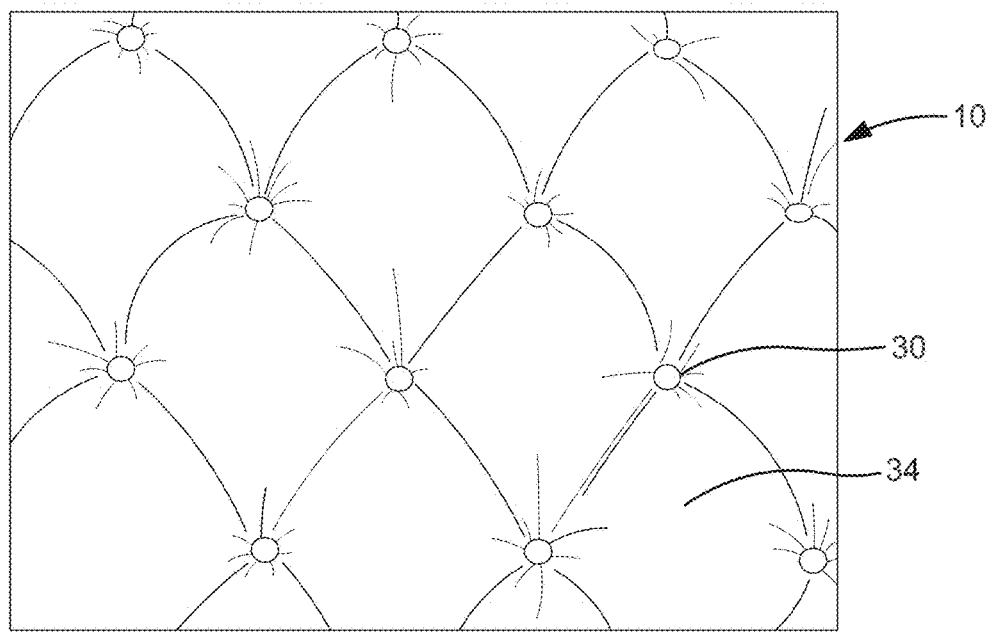
FIG. 1 is an illustration of an exemplary quilted membrane.

The nuances and subtleties of this disclosure can be described with specificity by use of specific definitions of terminology. The description uses accepted dictionary definitions and adds precise parametric limitations as needed. The term 'galvanic' means, 'of or relating to direct-current electricity, especially when produced chemically'. It will be used as a modifier, 'galvanic material' and is here referred to as material of description relevant to this disclosure having established galvanic properties. 'Membrane' shall mean, 'a thin sheet of natural or synthetic material that is permeable to substances in solution'. 'Sheet' means, 'A broad, thin mass or piece of material and 'thin' shall mean material characterized as having area enclosable by a circle of defined diameter. It also has a thickness dimension drawn normally from a first surface to an enclosing second surface that is less than $1/10^{th}$ of the defined diameter dimension and varies by no more than 10% of the materials natural uncompressed state. In this disclosure an electrically conducting porous membrane may be referred to as a galvanic membrane. It has a first surface adjacent a conducting surface and may be referred to as a galvanic pellicle meaning: a thin skin or membrane; film. The conducting surface is usually metal and may be impervious solid or porous and permeable to electrolyte.

If the electrical resistance, R of both of their electrodes is reduced without a concomitant reduction of either electrode energy content, electrical current density can be increased proportionately as $i=V/R$ and power or rate of charging, $iV=V^2/R$ also increases. This invention shows how to substantially reduce electrode resistance. The following confirms that such reduction need not be accompanied by a reduction of energy capacity, density or content in either electrode.

In one example, cohesive nonwoven CNT fiber membrane mat material is the structure containing one of; active faradaic and catalytic material either as coatings on CNT fibers or as particles lodged and immobilized within the fibers. The density of a CNT Chiral fiber is 1.4 g/cm$^3$. It has a lattice parameter of about 1.65 nm and there is not much variation of these parameters among the various forms. The density of a cohesive nonwoven CNT pellicle varies from about 0.2 to 0.5 g/cm$^3$. Therefore, the volume fraction of CNT in electrodes of this invention is about 14% to 35%. That leaves 85% to 65% empty space for electrolyte and active battery material. Assuming 25% for electrolyte wetting of CNT surfaces, about 40% to 60% of electrode volume remains for active battery material.

Active cathode material requires the most volume with material density of 4.1 g/cm$^3$ and energy density of 0.658 Wh/g. It is typical material in a Li-ion battery and is the energy storage driver since Li metal is substantially more compact especially as stored in a Si coating of CNT. Assume two paired electrodes, i.e. anode and cathode to comprise a battery. CNT cathodes are typically 100 μm thick and the same is assumed for the anode although that assumption is rather pessimistic. Allow 50 μm of separation and another 50 μm for the metal current collector. The unit cell battery is 300 μm thick overall. There is room for only 4 to 6×10$^3$ ml of active material in 30×10$^{-3}$ ml of unit cell battery composite electrode. In other words 1 ml of battery contains 0.133 to 0.2 ml of active cathode material which is used in the example as the energy storage parameter for a conservative but reasonable estimate. That is 0.547 to 0.82 g of spinel which amounts to 0.36 to 0.54 Wh/ml or ≈½ kWh/Liter. The calculation was based upon a 100 μm thick cathode. We have produced 300 μm cathode thicknesses. That provides a conservative estimate of ≥1 kWh/L which exceeds the industry standard; especially because additional cooling volume is not required.

Electrically conducting galvanic material is at least an electrically conductive porous membrane (hereinafter referred to as an Active Membrane, (AM) and becomes a pellicle covering a conducting surface of this disclosure. It comprises at least one of; cohesive nonwoven single- and multi-wall carbon nanotubes (CNT), single and multiple layers of woven CNT, one and multiple layers of graphene, single and multiple layers of cohesive nonwoven and woven carbon fiber, single and multiple layers of woven and cohesive nonwoven TiO$_2$ nanotubes and nanofiber and combinations thereof. The tensile strength of the cohesive nonwoven structures shall be not less than 2 MPa so that they can be handled as freestanding pliable membranes and laid upon metal backing. Tensile strength of graphene and CNT is higher than anything else on the planet at more than 100 GPa. Carbon structures of this disclosure are permeable to and contain one of; liquid and gel electrolyte comprising aqueous or aprotic solutions and/or suspensions.

Galvanic materials are used as hereinabove described for supercapacitors without adding, respectively, faradaics for batteries or catalyst for fuel cells where they have not been widely used for either in prior art. Very high concentration of electrode surface area to support a capacitive ionic double layer and a negligible ion kinetic issue motivates their use for supercapacitors. Surface area of 1,500 to well over 2,000 m²/gram is possible with the described galvanic material. However, electrical contact resistance between the galvanic pellicle and the metal surface remains too high to realize both energy and power capacity for any of the electrochemical cells that are the subject matter of this disclosure.

Some of the most advanced faradaic battery and catalyst fuel cell anode and cathode materials are in the form of particles having enclosing spherical diameter in the range of ½ to 10 µm. Prior to this invention they could not be incorporated into any of the above described graphene or CNT structures as freestanding galvanic membrane electrodes because their position and distribution within the membrane could not be stabilized merely by holding them against metal backing with a covering permeable membrane. They are used in paste applications with binders in prior art. A discovery of singular importance in this invention is the ability to stabilize these particles within the galvanic membrane as a consequence of its novel method of attachment for low electrical resistance purposes. Particles as well as nanoscale carbon surface strongly coupled coatings can comprise 20% to 60% of the galvanic membrane volume. Particles are uniformly distributed within the membrane's volume in the process of forming the membrane. In the case of nonwoven CNT they can be co-precipitated from suspension. For woven and graphene single sheet structures they are applied as weakly coupled particle coatings to one side of each layer prior to stacking of multiple layers. Particle surface layer applicators are known in the art. Thus, particles become entrained but not yet immobilized within the galvanic membrane structure.

Ultralow resistance electrodes begin as electrically conductive porous membranes (AM) and are freestanding components comprising a plurality of basic nanoscale graphene structures (e.g. sheets or tubes, CNT) as specified hereinabove. Carbon surfaces are one of; coated with strongly coupled galvanic material and combined with galvanic particles held within the membrane. The membrane first surface is adjacent a conducting surface. The structural combination is sometimes found in prior art mainly in scientific literature describing research into advanced and emerging faradaic materials. Absent coatings and entrained particles it is an architecture used in commercial supercapacitors because of a high surface density provided by nanoscale carbon. It has not been used for commercial secondary batteries and fuel cells that use pastes containing similar nanoscale materials formed with binders held in place by ion selective semipermeable membranes because, in those applications, there is no possibility for an improved low resistance electrode. AM, or electrically conducting porous membrane and electrically conducting surface are building blocks of the present invention.

Electrical contact resistance between an AM first surface and, e.g. metal, is too high to be of advantage over ordinary paste applications that, counterintuitively, have the same contact resistance. The purpose of this invention is to reduce that resistance by several orders of magnitude. It is implemented as follows. The AM first surface is adjacent the conducting surface whereby, a) not more than 10% of AM opposing outer surface area is one of; compressed against and embedded into the conducting surface, b) no point within one of; an uncompressed and unembedded area is more distant from a nearest one of; a compressed and embedded area than three times the mean uncompressed thickness dimension of the AM defined as being measured prior to placement on the conducting surface and c) electrical resistance measured from one of; the compressed and embedded portion of the outer surface to the conducting surface is less than 10 micro-ohm, µΩ). The value is physically measurable by ohmmeter probes.

This invention does not require separators, filters or expensive ion selective membranes to prevent short circuit or exchange of galvanic materials between polar electrodes. Galvanic materials as strongly coupled sheet or CNT graphene coatings or as lodged and immobilized galvanic particles within the electrodes of this invention cannot be dislodged as configured in accordance with U.S. Pat. No. 9,337,474. This invention can use the most advanced or emerging nanoscale galvanic material for their associated high specific electrochemical activity in electrodes.

The term electrical conduction sink is defined as having virtually zero ohmic resistance to electrical conduction. This definition should not be confused with the somewhat more complex electrical engineering definition of a junction as a current source depending only upon elements and voltages elsewhere in a circuit, i.e. a junction having 0 impedance. In the instant invention they comprise a plurality of proximally spaced apart discrete areas wherein the full thickness of galvanic material (pellicle layer) is one of; compressed against and embedded into the metal surface. Compression or embedment should not sever high tensile strength fibers or graphene layers comprising the sink. Those should lead unaltered into and become contained within the sink. Touching, i.e. ordinary contact with the sink by severed graphene merely creates the same electrical conduction barrier that produces high resistance between galvanic material and an adjacent metal surface. Thus, even if galvanic material comes completely off of the metal surface between sinks, as is common in ordinary use, it is of no account because that form of contact contributes little or nothing to the main electrical conduction path provided by the sinks.

With reference to the design of FIGS. 1 through 7b, the following calculation considers three typical compression patterns among an infinite number of possibilities that satisfy the novel criteria describing the instant invention. These will be a hexagonal, square and 60° triangle pattern of a plurality of circular compression areas and a pattern of contiguous square ribs. All will have less than 10% compressed area. The following calculation shows that any pattern of a plurality of spaced apart noncontiguous compression areas is preferred over contiguous or discrete line segments. Nevertheless, the invention is not limited to a particular pattern so long as the novel criteria are met.

In a hexagonal pattern compression locations must be separated by ≤3t. t is membrane thickness. The enclosing circle diameter, d of each compression is ≤1.22t or about ⅓$^{rd}$ of the spacing, D between them. That limit is easily met. If a compression pattern is based upon a square distribution, compression locations must be separated by slightly less restrictive≤4.2t and the compression diameter values are d≤1.51t or ≤0.36D. For a triangular pattern separation is least restrictive at 5.2t and the d is ≤1.7t or 0.33D. The hexagonal pattern is best when a villiform compressor is used because it contains less ribbing or strut area connecting compression points. As an embedding tool the triangle pattern is best because it relaxes positional tolerances. Either pattern tolerates compression diameters not less than pellicle thickness which militates against membrane cutting and piercing. For a matrix pattern of contiguous ribs, rib width must be ≤0.05D or ≤0.3t to satisfy the same 10% criterion. That is more difficult because compressors that are too narrow may cut into the membrane. That must be avoided for purposes of this invention, so contiguous line segments are not preferred.

The pattern is intended to shorten the distance electricity must travel within the membrane to reach a conduction sink where it can transfer charge to metal at negligible ohmic resistance. It is understood that prior art contact with metal can be problematical within uncompressed areas of the membrane although electrical conduction within the membrane remains active. This invention neither depends on nor requires electrical contact or even attachment of the AM with the conducting surface within uncompressed areas.

Gaberscek and Ma used galvanic paste on metal backing to explore applying pressure to the electrode to improve its discharge power. Pressure applied to total electrode area for a period of time had to be relaxed for one hour to recover electrolyte permeation and electrical viability which did improve somewhat compared to uncompressed samples. But maintaining effective pressure over the entire electrode for continuous use is clearly not suitable. By limiting compressed area to less than 10% for an entirely different purpose, namely, electrical connection the remaining 90+% need not be sacrificed.

Referring now to the figures, FIG. 1 is an illustration of a quilted membrane of a first electrode 10. Electrically conductive porous membrane (AM) material 34 in the hills is stretched, somewhat compressing contents within. CNT fibers and graphene layers are tightened around particle contents thus improving charge transfer at that interface, electrical conduction to the current collector and ion exchange with electrolyte. "Buttons" illustrate compression or embedment at 36.

Figure 6A:
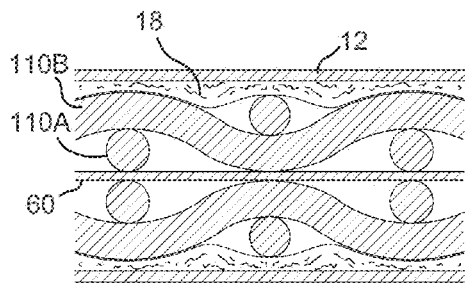
FIGS. 6a and 6b are sectional views of exemplary facing polar opposite (positive and negative) electrodes separated by a flat dielectric screen having clear windows matching those of both wire screens.
Figure 6B:
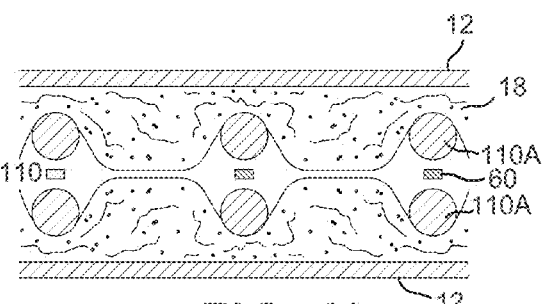

The first electrode is generally designated by reference numeral 10. While the electrode is suitable for use in a variety of electrochemical cells, including fuel cells, electrolysis cells, galvanic batteries, and also including supercapacitors etc., it is understood that electrochemical cells are well known in the prior art, and hence no detailed electrochemical cell is included in the accompanying drawings. A suitable electrochemical cell for use of the present electrode 10 is shown in the inventor's U.S. Pat. No. 8,283,062 at FIG. 1A in that patent. In particular, an electrode at reference numeral 34 in that patent is also shown in FIG. 1A. For purposes of efficiency and of showing use of the present electrode 10 in an electrochemical cell, the aforesaid U.S. Pat. No. 8,283,062 is hereby incorporated herein by reference thereto for that purpose. A simplified electrochemical cell is shown in FIGS. 6a, 6b.

Figure 2:
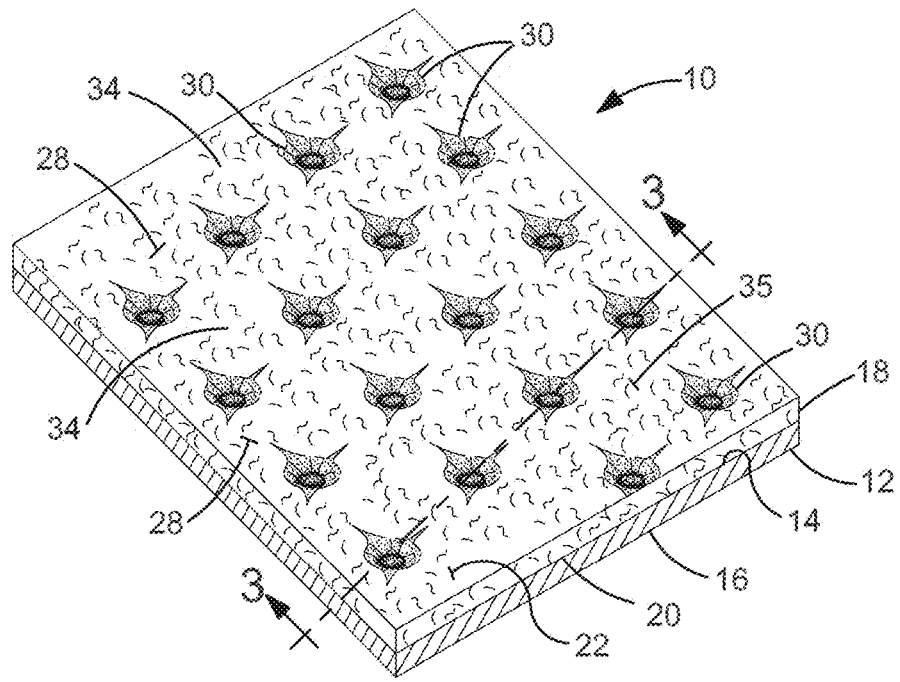
FIG. 2 is a perspective view of FIG. 1 showing attachment to the conducting backer.
Figure 3:
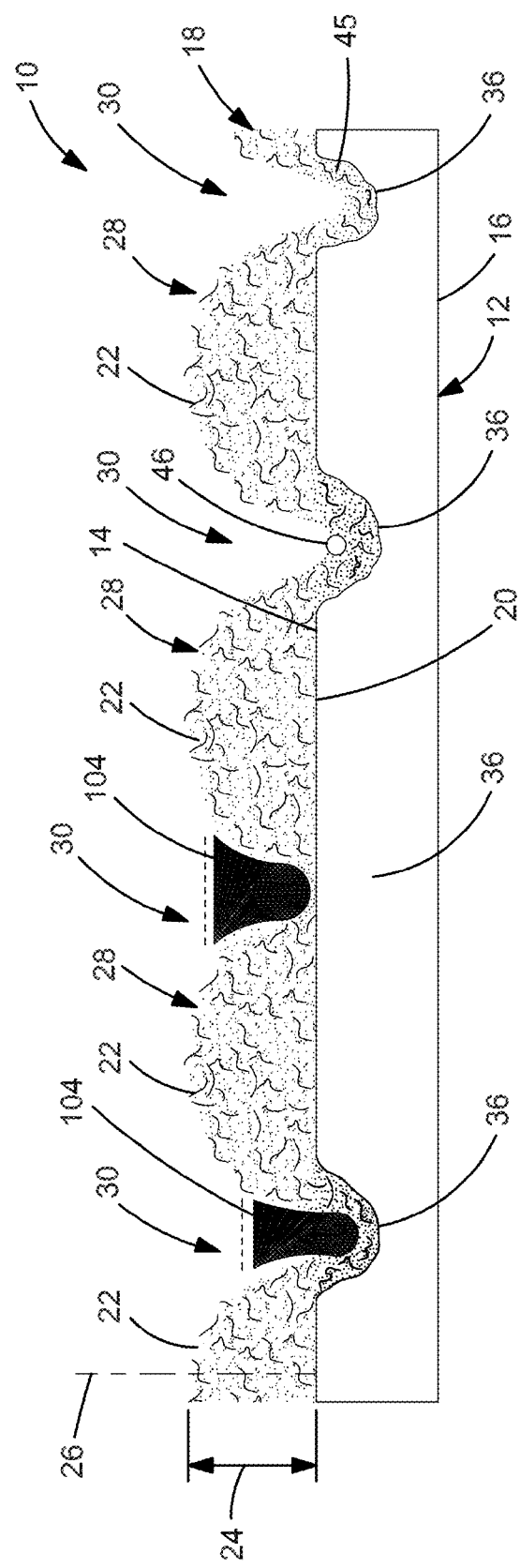
FIG. 3 is a fragmentary cross-section view of FIG. 2 taken along sight lines 3-3 showing alternative typical examples of compressed and embedded attachment to a metal surface.

As best shown in FIG. 2, the present electrode 10 includes a support 12 having an electrically conductive surface 14 and an opposed base surface 16. A galvanic pellicle 18 is secured to the conductive surface 14 of the support 12. The galvanic pellicle 18 has a first surface 20 and an opposed outer surface 22. As best shown in FIG. 3, the galvanic pellicle 18 also has an uncompressed thickness dimension 24 which is defined as a longest distance of a straight axis 26 extending from a position normal to the first surface 20 and the outer surface 22 of an uncompressed section 28 of the galvanic pellicle 18. The galvanic pellicle 18 is secured to the conductive surface 14 so that the first surface 20 of the galvanic pellicle 18 is adjacent and contacts the electrically conductive surface 14.

Additionally, the galvanic pellicle 18 is secured to the electrically conductive surface 14 by at least one of a plurality of connected areas 30. Uncompressed sections 28 of the galvanic pellicle 18 are defined between the connected areas 30. The plurality of connected areas 30, are positioned so that any point 35 within any uncompressed section 28 is no more distant from one of a nearest connected areas 30 than about ten times the uncompressed thickness dimension 24 of the galvanic pellicle 18. (For purposes herein, the word "about" is to mean plus or minus ten percent).

The galvanic pellicle 18 shown in FIGS. 2-5 may include at least one of; a cohesive mat 18 of nonwoven single-walled carbon nanotubes 2; a cohesive mat 18 of nonwoven multi-walled carbon nanotubes (not shown); a plurality of layers 18 of multilayer graphene sheets (not shown); single-walled carbon nanotubes grown on woven carbon fiber 18; multi-walled carbon nanotubes grown on woven carbon fiber 18; and combinations thereof.

FIG. 2 shows that the uncompressed sections 28 of the electrode 10 include at least about ninety percent of the outer surface 22 of the galvanic pellicle 18. FIG. 3 shows at least one of a plurality of connected areas 30. It can be seen that the compressed portions 36, 38 of the galvanic pellicle 18 include less than about ten percent of the outer surface 22 of the galvanic pellicle 18.

One of a plurality of connected areas 30 of the galvanic pellicle 18 may be embedded into the conducting metal surface 14 by compressing the full thickness of the pellicle 36 into the metal surface using a removable forming tool or die known as a sustainable compressor or embedder 104; thus filling the depression with compressed pellicle material. This is shown at reference numeral 45 on the right side of the electrode 10 of FIG. 3. The embedder 104 is configured to cause penetration of the metal surface. Whether or not the compressor or embedder 104 penetrates the metal surface they may not penetrate or cut the membrane. The latter is possible because CNT fibers have a tensile strength of 60 or more GPa (300 GPa theoretical). Optionally, a plurality of individual connectors 46 (also shown in FIG. 3) may join with the embedded pellicle 36 if additional attachment strength is needed. It is noted that the individual connectors 46 are any connector means known in the art for compressing or embedding the entire thickness of the carbonaceous galvanic pellicle 18 against or into a metal surface, such as the conductive surface 14 on the support 12 and for remaining in one connector piece as compressed embedded portions 36 of the pellicle material 18, plus any connectors 46 when exposed to the compressive forces described herein. The additional connector means 46 need not be themselves electrical conductors. For example, Yttrium Stabilized Zirconium, YSZ, Ni, metal alloys, hard steel and Al spheres in a range of enclosing diameters of about one fourth to two times the thickness of the galvanic pellicle uncompressed thickness dimension 24 can be forced to embed the full thickness of the pellicle without penetrating or tearing the pellicle 18 into a heated metal surface and remain embedded therein. A limitation of one fourth to two times the thickness of the galvanic pellicle applies to the minimum dimension of raised compressing structures of a removable embedding tool (not shown). Electrical conduction is from within the pellicle, through the portion of pellicle compressed and embedded into the conductive metal surface 14.

The connected areas 30 may be compressed in the form of axially aligned square weave metal screens and a similarly aligned planar rigid dielectric screen 110 or a villiform (on both sides) dielectric compression screen 50, 70 (shown in FIGS. 4, 5 and 7), against or embedded into the electrically conductive surface 14 to restrict removal of the galvanic pellicle 18 from the surface when exposed to an extraction force of liquids flowing at a rate of up to about 1.0 cm/second through or over the pellicle.

Figure 4:
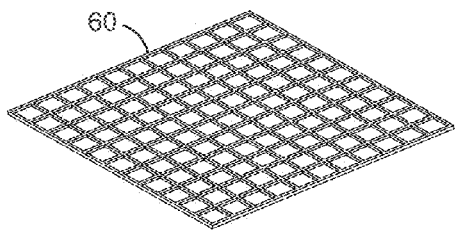
FIG. 4 is one of an exemplary smooth flat dielectric screen and removable embedding tool having clear windows matching the active uncompressed areas of the membrane.

FIG. 4 shows a planar dielectric open grid separator screen 60. The screen 60 acts as a dielectric separator and is shown in FIGS. 6a, 6b, sandwiched between the screens 50.

Figure 5:
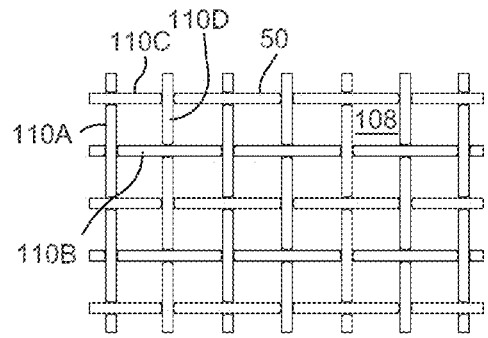
FIG. 5 is an illustration of an exemplary open square weave metal wire screen.

5, and 7 show a simplified schematic top plan view of square pattern screen structures formed by continuous connected struts 110 or contiguous segments 110A, 110B, 110C, 110D. In FIG. 5 they are metal wires. Square weave metal screen is inexpensive, easily available and creates, by its very nature, high points where the wires cross. Screen wire encloses windows 108 but does not compress the pellicle against the metal except at crossover points. Windows 108 align with the windows of dielectric flat screen 110 (FIG. 4) when combined and assembled as electrochemical cell electrodes shown in FIGS. 6a and 6b. A dielectric two-sided villiform screen 60 made from high modulus (e.g. PAI/glass/epoxy formed in a high resolution 3D printer) highly incompressible material connects villi compressors by virtue of ribs 110. Open areas 108 define locations for uncompressed sections 28 between contiguous segments 110A, 110B, 110C, 110D of the screen, wherein the struts or contiguous segments 110A, 110B, 110C, 110D are configured to be cooperatively positioned to define one of the open areas 108. Contiguous segments 110A, 110B, 110C, 110D can also be the pattern defining a removable hard steel embedding tool whereby the hard steel villi 112 serve as removable embedders. For that purpose contiguous segments 110A, 110B, 110C, 110D framing the windows of the screen 70 have villi 112 on one screen side whereby the opposite surface communicates with means for removable compression. Dielectric villi 112 are used to create compressed areas of the membrane when screen 70 and villi forming projections 112 are sustainably pressed against the membrane.

FIGS. 6a and 6b are sectional views of facing polar opposite (positive and negative) electrodes separated by a flat dielectric screen 110 having clear windows matching those of both wire screens 60. The assembly comprises a unit cell of a battery or supercapacitor. The electrodes comprise three layers; 1) metal sheet, 2) AM and 3) wire screen.

Figure 7:
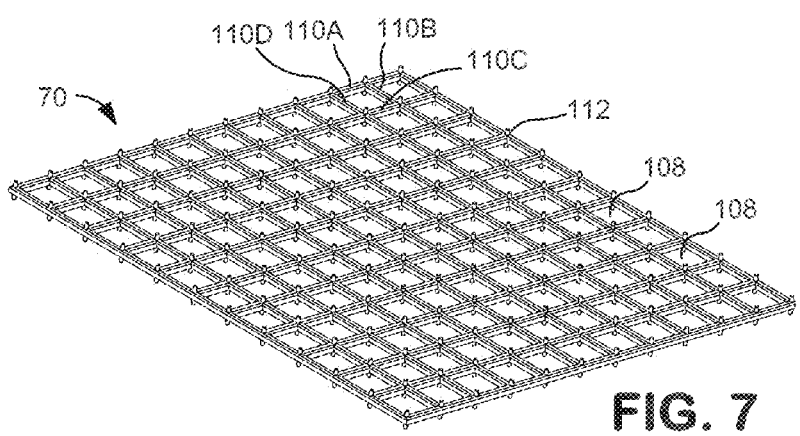
FIG. 7 is an exemplary two sided villiform dielectric screen which can be disposed between positive and negative two layer electrode assemblies each comprising only one metal sheet and one Active Membrane (AM).

FIG. 7 shows the two sided dielectric villiform screen 70. The screen 70 can be disposed between positive and negative two layer electrode assemblies each comprising only one metal sheet and one AM. Villi 112 are again used to create compressed areas of each membrane when layers and villiform projections are sustainably pressed. It replaces both metal wire screens and the flat dielectric screen and produces the equivalent electrode pair sectional view of FIG. 6b.

Figure 7A:
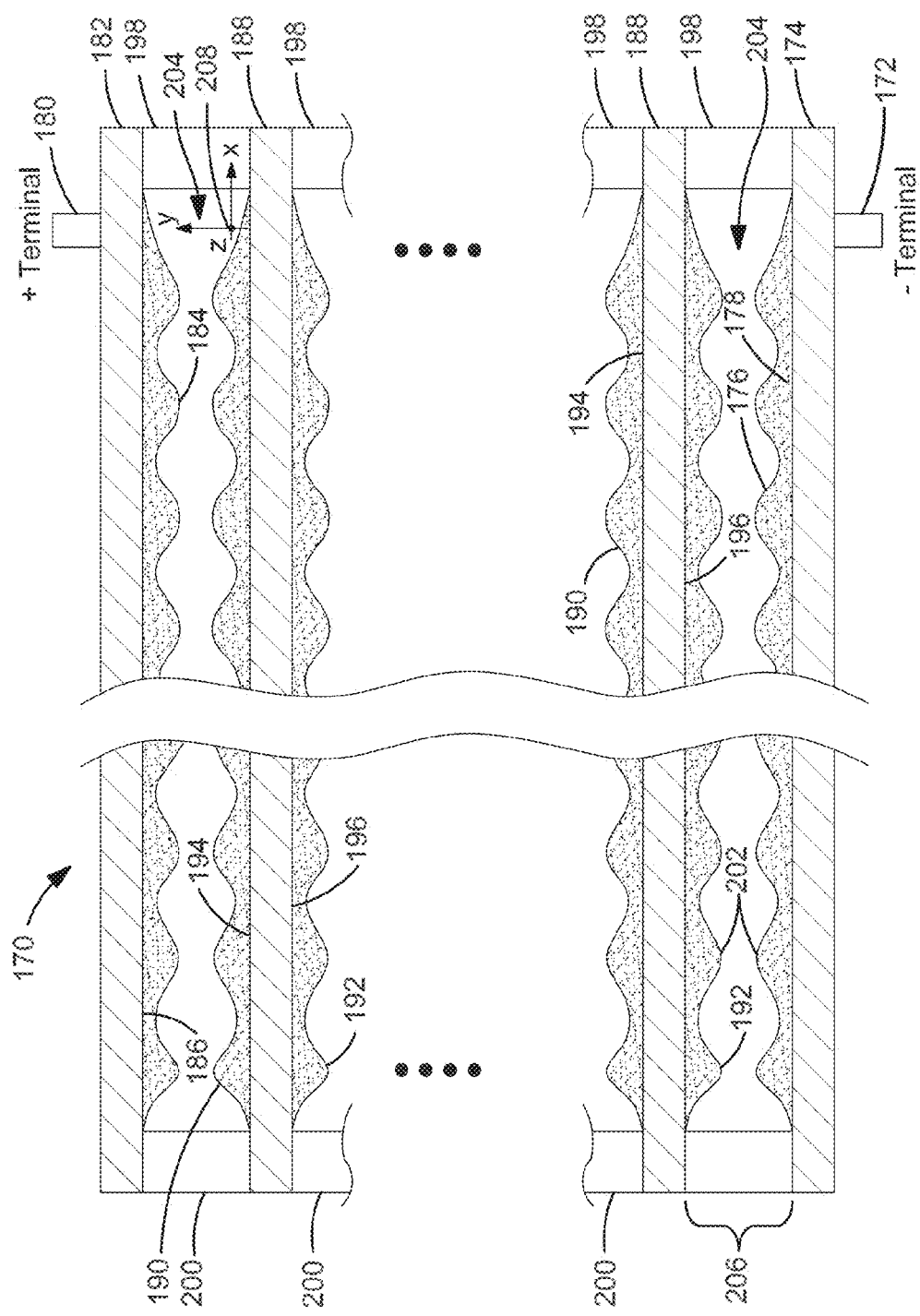
FIG. 7a is a sectional view of a stack of exemplary spaced apart polar opposite (positive and negative) electrodes produced by a one sided villiform removable embedding tool. Each pair comprises a unit cell sharing common metal layers with cells above and below.

FIG. 7a is a cross-sectional, fragmentary side view of a second electrochemical cell stack 170 of exemplary spaced apart polar opposite (positive and negative) membranes, 190 and 192 forced by a one sided villiform removable embedding tool into opposite sides of metal sheet 188. Each facing membrane pair comprises a unit cell 206 sharing common metal layers with cells above and below. The stack is shown as connected in series high voltage but may be parallel connected as well.

FIG. 7a shows a negative anode terminal 172 attached to a solid (porous is also acceptable) metal sheet with a conductive surface 174 that also has a galvanic pellicle 176 attached to the conductive upper side of the metal sheet 174. A positive cathode terminal 180 is attached to a second solid or porous metal sheet with a conductive surface 182 that also has a second galvanic pellicle 184 attached to the lower side 186 of the sheet 182 (wherein "lower" is as shown using ordinary directions in FIG. 7a). In between the first galvanic pellicle 176 and the second galvanic pellicle 184 are n such metal sheets 188 with additional upper galvanic pellicles 190 and additional lower galvanic pellicles 192 attached respectively to upper conductive surfaces 194 and to opposed lower conductive surfaces 196 of the additional n number of metal sheets 188. Each of the n number of additional metal sheets 188 is separated from the others by dielectric spacers 198 on the right side of cell 170 and by additional dielectric spacers 200 on the left side of the FIG. 7a cell.

The galvanic pellicle 176 secured to the conductive upper side 178 of the metal sheet 174 and the adjacent lower galvanic pellicle 192 secured to the lower side 196 of additional metal sheet 188 and facing the galvanic pellicle 176 cooperate to form a pair 202 of facing, polar opposite galvanic pellicles 176, 192. Each such pair 202 of facing polar opposite pellicles is spaced apart to define a space 204 and define a unit cell 206. Each intermediate metal sheet 174, 188 serves as both and anode and a cathode, thereby forming a series connection of n unit cells 206 anode to cathode repeated n times. Each metal sheet 174, 182, 188, has a galvanic pellicle 176, 184, 190, 192 attached on opposed planar sides of the sheet 174, 182, 188. However, a metal sheet 174, 182, 188 may also include two separate but adjacent metal sheets 174, 188 having a pellicle 176 attached to only one side, such as the conductive upper side 178. In such a configuration, care must be taken to cause the anode galvanic pellicle 176 to face upward as in the FIG. 7a drawing and the adjacent cathode galvanic pellicle 192 to face downward as in the FIG. 7b drawing. In this configuration, the anode pellicle 176 is loaded or coated with faradaic material (not shown) that is more electronegative than faradaic material (not shown) loaded or coating the adjacent cathodic pellicle 192. With or without convection electrolyte flow 208 (shown in FIG. 7a by flow direction arrow 208), each unit cell 206 defines a battery form or the FIG. 7b electrochemical cell 170.

Figure 8:
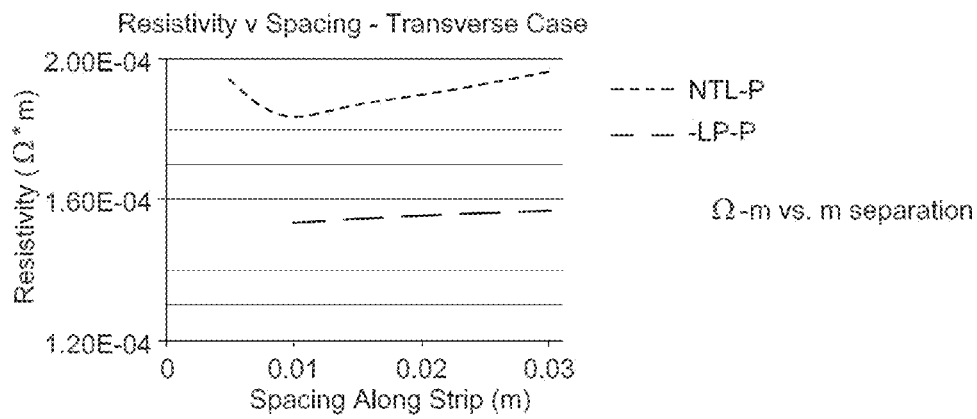
FIG. 8 is a chart of bulk resistivity, ohm-m in the plane of sample galvanic membranes.

FIG. 8 is a chart of bulk resistivity, ohm-m in the plane of sample galvanic membranes made in house and purchased commercially. Experimentally measured data is essential to a calculation of net electrode resistance using material in accordance with the invention. It cannot be inferred from known conductivity data respecting components, e.g. CNT or graphene that comprise the membrane due to complexity of composite structures.

Evanoff, *Ultra Strong Silicon-Coated Carbon Nanotube Nonwoven Fabric as a Multifunctional Lithium-Ion Battery Anode*. American Chemical Society vol. 6, NO. 11, 9837-9845, (Oct. 17, 2012), used nonwoven CNT (also used in this invention) to make galvanic membrane electrodes; specifically anodes with the suggestion that cathodes could be made in similar fashion. The idea is that electrical connection can be made at the edge of the membrane on the assumption that conductivity in the plane of the membrane mimics that of the CNT fibers which is twice that of silver metal.

FIG. 8 shows that not to be a valid premise. Electrical conduction along CNT fiber length is indeed very high but not through its wall. Randomly oriented and tangled fibers as obtains in nonwoven 'buckypaper' limit charge transfer conductivity to all but fibers longer than the area dimension of the membrane as proven by the data of FIG. 9. Conductivity can only be high between points closer than fiber length. In this invention unbroken fiber length is several times membrane thickness. For any galvanic membrane of appreciable area and power capability connection at its edge suffers from high electrical resistance in the plane of the sheet. Graphene is known for its high conductivity but multilayer graphene required for substantial energy storage capacity suffers too many defects for that conductivity to be realized over long distances. A single defect anywhere in a CNT fiber or graphene sheet is like a break in a metal wire.

Electrical conductivity along CNT fiber or in the plane of graphene sheet is twice that of silver metal or ≈$10^6$ Siemen/cm but it must be remembered that a single graphene sheet or several sheets is very thin as is a galvanic membrane so lateral conduction in the plane of the sheet has very little cross section for conducting electricity. As a practical matter when one assembles a substantial mass of nanoscale graphene sheet or CNT, woven and nonwoven to comprise a galvanic membrane, lateral bulk resistance within the membrane is ≈$10^{-2}$ ohm-cm as shown in FIG. 8 to report actual experimental data. The reason for 4 orders of magnitude higher resistance is the accumulation of imperfections in graphene structure over extended distance. It simply does not have continuity in its conduction path as is common in metal. Paste coating using carbon powder is normally in the range of 50 to 100 μm thick whereas galvanic membranes of this invention will be ≈50 μm to 1 mm in thickness. Unperturbed CNT fiber length of, or graphene sheet imperfections separated by, at least 3 mm comprise 15% to 50% of material used to make active porous galvanic membranes, AM of 1 mm or less thickness in this invention. The material is commercially available and will assure that a point furthest from its nearest compression is electrically connected to an electrical sink as now further described.

Tensile strength of a short length of continuous CNT fiber or graphene absent defects is higher than any other material at 130 GPa and both are supremely flexible. A removable embedding tool or multipoint compressor will force the AM comprising these materials respectively into or onto the metal surface without cutting the material if compressors do not have sharp points, corners or edges. A continuous uninterrupted graphene electrical conduction path is established from a farthest point of active galvanic chemistry to a conduction sink in low resistance contact with the metal. It is understood that CNT is graphene rolled into a tube.

Figure 9:
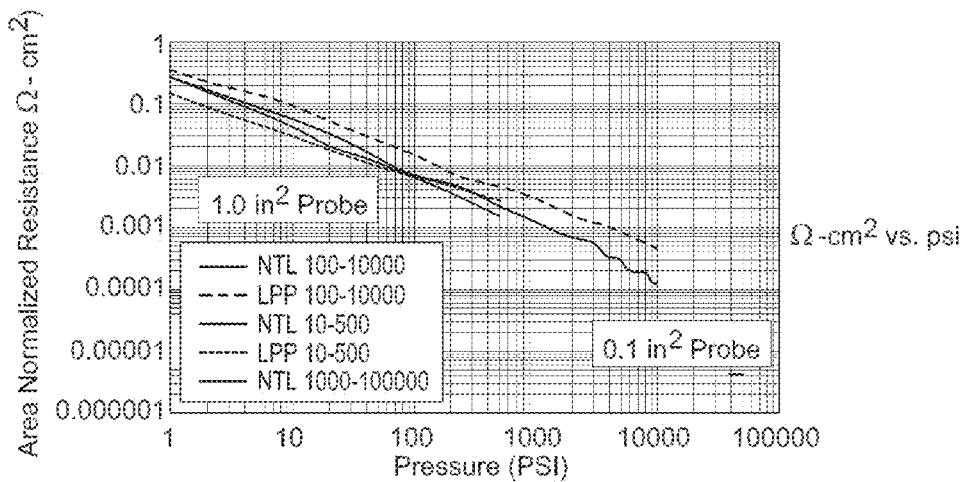
FIG. 9 provides resistance data measured between the outer surface of sample galvanic membranes and the metal support surface normalized to electrode area as a function of pressure.

The invention's operative criterion specifies resistance rather than pressure because it is about electrode architecture dedicated to achieving ultralow resistance by application of sustained pressure on or by embedment into a conducting, e.g. metal surface of a plurality of small areas of an AM. Experimental data is plotted in FIG. 9 showing the relationship of ohmic resistance normalized to 1 $cm^2$ electrode area as a function of static applied pressure. A number of samples of galvanic membrane comprising graphene structures as above described, both purchased and made by the inventor, were tested. Using probes of an ohm-meter it is very easy to measure resistance between a membrane's compressed outer surface and the metal backing. When pressure within the compressed area reaches 7×$10^3$ Newton/$cm^2$ resistance falls to less than $10^{-5}$ ohm (10μΩ) for all test samples. The value is central to the purpose of this invention, namely to reduce effective electrode resistance respecting prior art by at least three orders of magnitude.

When the effective contact resistance between small uncompressed area portions of the membrane and metal backing becomes negligible, i.e. less than 10 μΩ for current flowing through compressed membrane portions from within uncompressed portions, such current sees only operative bulk resistance along a short path to the electrical conduction sink. U.S. Pat. No. 9,337,474 by this inventor used spread function analysis to compute that resistance which is in parallel to all similarly situated portions. Experimentally measured bulk resistivity of FIG. 8 was used in the calculation although that may be less as the quality of graphene improves with further development to reduce defects in its structure.

It is clear that, using presently available materials the method of this invention reduces net electrode resistance with respect to 1 $cm^2$ of electrode area to $10^{-4}$ or at most $10^{-3}$ ohm-$cm^2$. That is more than three orders of magnitude less than prior art values of ½ to 10 ohm-$cm^2$. The importance of such low resistance in electrodes for electrochemical cells is apparent to those skilled in the art and further reduction may not be as compelling.

FIG. 9 provides resistance data measured between the outer surface of sample galvanic membranes and the metal support surface normalized to electrode area as a function of pressure. Copper probes of various sizes were used with a sensitive ohmmeter and the membrane compressed over a large range of pressure. 1 psi, is the approximate pressure normally applied to the entire membrane or paste in a prior art assembly. Resistance is consistently about ½ to ¼ ohm-$cm^2$. At 7,000 Newton/$cm^2$, resistance in all samples was less than 10 μΩ. Ohmmeter sensitivity was unreliable below that value but it became clear that higher pressure would reduce contact resistance to short circuit values.

Compression and embedment are only means to the object of the invention which is to create a plurality of closely spaced apart locations in the galvanic membrane where it has contact resistance to metal backing of less than 10 μΩ while leaving the remainder of the membrane undisturbed respecting its electrochemical properties and activity. To practice the invention an ohmmeter with probes is used to measure resistance at any point within any one of the plurality of local conduction sinks distributed on the membrane area, the compressed areas comprising a collective area that subtracts less than 10% from the membrane's electrochemically active area.

Pressure and embedment can produce the required local contact resistance between the outer membrane surface and a conducting surface with further utility as now explained. Sassin, Wang and Evanoff showed faradaic materials being lodged and immobilized in strongly coupled coatings on the surfaces of graphene galvanic structures to comprise electrodes. Those methods are used in this invention to make porous galvanic active membranes, AM. Ma had to use prior art paste formulations with binders and covering membranes to test high energy capacity cathode particles in Li-ion battery electrodes as the only way to stabilize them. The method described in this invention for securely attaching AM to a conducting surface to form a galvanic pellicle on that surface has the added benefit of immobilizing particles otherwise lodged and distributed within the membrane.

Notice should be taken of the fact that pressure of 7,000 Newton/$cm^2$ within the compressed area is generally sufficient to lower bulk plus contact resistance to less than 10 micro-ohm-$cm^2$. This pressure is created at all compressed areas when applied pressure over the membrane as a whole is only 700 Newton/$cm^2$ because less than 10% of the area is compressed. If only 5% of the area is compressed the pressure multiplier is 20 to 1.

Figure 10:
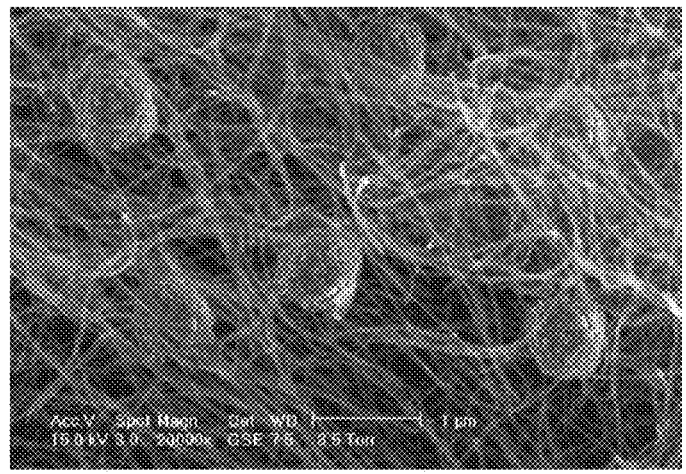
FIG. 10 is a SEM photo of a nonwoven CNT membrane made by the inventor showing typical cathode particles with approximately 1 μm enclosing spherical diameter entrained by web-like strands of CNT.

FIG. 10 is a SEM photo of a nonwoven CNT membrane showing typical cathode particles with approximately 1 μm enclosing spherical diameter entrained by web-like strands of CNT. These particles wash out of the membrane when permeated by 1 cm/sec convective electrolyte flow if membranes are merely adjacent porous metal support but become stably lodged and immobilized under the same convective flow when the membrane is compressed onto or embedded into the metal as specified and described herein.

Figure 11:
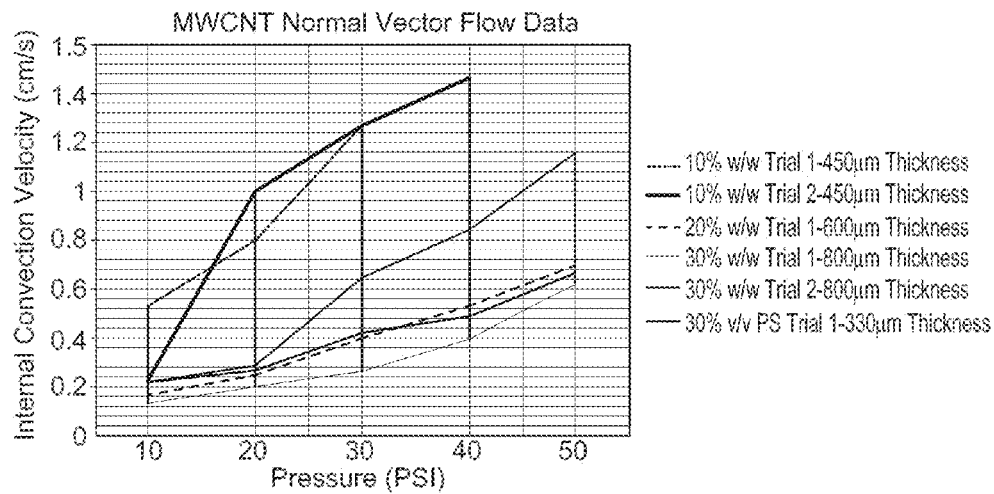
FIG. 11 is membrane permeability data used in part to test particle stability reported for samples such as depicted in FIG. 10.

Stretched graphene and CNT surfaces compress the particle/electrolyte interface, further reducing charge transfer resistance. Also the prior art requirement of a solid covering ion permeable but restrictive membrane to retain otherwise unstable galvanic materials within a paste coating is removed FIG. 11 is an AM (galvanically active membrane) permeability data used in part to test particle stability reported for samples such as depicted in FIG. 9. Samples were tested both as laid upon porous metal backing with negligible applied pressure and secured as required by this invention.

Similar samples, some containing particles and some not, were laid upon a porous metal backing and electrolyte forced to flow through both galvanic pellicle and metal. FIG. 11 shows various rates of permeability based upon formulations of the CNT suspensions for that specific purpose. The discovery, not known heretofore, is that particles wash out of a membrane as expected when it is not secured to the porous metal backing as specified in this invention to lower electrical resistance. But if secured by a plurality of closely spaced compressors as described in and required by this invention, the particles did not wash out even under convective flow of 1 cm/sec. Electrolyte flow permeated a particle containing membrane secured to the conducting surface, which can be solid or porous, in accordance with the invention as described above and the particles remained lodged and immobilized within the membrane, i.e. electrolyte ran clear. It is thus proven and claimed that porous galvanic active membranes of this invention can contain and immobilize particles having enclosing spherical diameter dimension of 0.5 to 10 µm in addition to strongly coupled coatings on graphene surfaces to serve as stable galvanic material in ultralow resistance electrodes.

Figure 12:
FIG. 12 is a microphotograph of the imprint made by a square weave metal screen in a galvanic pellicle which was removed from an electrode.

FIG. 12 is a microphotograph of a membrane portion removed from an electrode after being compressed by SS screen. The compression imprint reveals an intact membrane suffering no penetrations or cutting. Wrinkling of the uncompressed portions occurs upon removal from the electrode metal backing as the membrane dries. The wire cross points apply enough pressure to virtually eliminate contact resistance at those locations whereas between those locations the pellicle has and needs little, if any, electrical contact with the metal. Between compression points it can come completely off the metal backing but it remains uncompressed and electrochemically active. It has room (volume) to expand and contract with impunity. Yet, resistance between pellicle as a whole and supporting metal remains more than three orders of magnitude lower than conventional assemblies because distance between compression points is short and material bulk resistance is low.

The imprint was made by the square weave metal screen in a galvanic pellicle which was removed from an electrode. Uncompressed areas wrinkle as they dry but the sample shows no penetrations or cuts within compressed areas. Applied pressure exceeded 7,000 Newton/cm$^2$.

An important additional feature of the disclosed electrodes is temperature tolerance for use in fuel cells due to the previously mentioned absence of a separating permeable dielectric membrane.

The disclosed electrodes are the only electrodes that fully and permanently lodge and immobilize all galvanic materials, including particles that pastes cannot secure, within electrically conducting membranes. These materials are catalysts in the case of fuel cells. Secondary battery membranes must contain fluid or gel electrolyte. Fuel cell electrode membranes support higher current density if they are also easily permeable to electrolyte convection. Graphene in sheet form is stable up to about 200° C. in air and may have to be restricted to battery and capacitor applications. As CNT, temperature tolerance increases to 700° C. and will be suitable in high temperature fuel cells including molten carbonate. Ni and Ni stabilized with YSZ as anode particles and MnO$_2$ (O$_2$ reduction) catalyst at higher temperatures are as active and effective as noble metal catalysts. This and absence of membranes separating electrodes will greatly reduce the cost of fuel cell technology.

It is a purpose of this invention to reduce real axis resistance (e.g., Nyquist plots) by several orders of magnitude respecting previously achieved levels.

The invention provides a better way to reduce resistance and increase current density, especially for faster charging.

The invention provides a high capacitance, C and series voltage design freedom to achieve a substantial increase in both energy and power density.

Fuel cell electrodes in this invention will benefit from a combination of energy and power density improvements due to negligible ohmic resistance, the absence of an ion selective semipermeable membrane and electrolyte convection newly possible in combination with compact high voltage.

Area current density using electrodes of this invention in fuel cells is limited only by catalyst concentration and temperature at which they operate which is much higher than possible in the presence of ion selective separating membranes required in conventional electrodes.

Electrodes of this invention achieve electrical resistance $<10^{-3}$ Ω-cm$^2$.

The inventor has succeeded in reducing ohmic resistance to less than 1 mΩ-cm$^2$ which clearly translates into the possibility of very much higher voltage, current density and concomitant power in electrochemical cells. Data presenting bulk plus contact resistance as a function of applied normal pressure on CNT pellicles is shown in FIG. 9. 1 psi is the typical assembly pressure in a conventional winding or stack and corresponds to most reported values.

The essential elements and principles of the invention can be summarized as follows: They define an electrode for electrochemical cells; the electrode comprising an electrically conductive surface and an electrically conductive porous membrane having a first surface and an opposed outer second surface separated from the first surface by a thickness dimension defined by the length of a vector normal to the first surface and extending to where it intersects the opposed outer second surface within an uncompressed portion of membrane and wherein; the membrane first surface is adjacent the electrically conductive surface. Definitive controlling conditions are that not more than 10% of the membrane's outer second surface area shall be one of; compressed with sustained force toward and embedded into the electrically conductive surface; no point within any uncompressed membrane area is permitted to be further from a nearest compressed area than three times the defined thickness dimension of the membrane and wherein; electrical resistance between a location within a compressed outer second surface and the conducting surface must be less than 10 micro-ohm. The latter condition defines the amount of compression force required to produce the sine qua non low resistance. Higher compression produces lower resistance until the specified value obtains.

There has been provided an electrode for electrochemical cells. While the electrode has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An electrode for electrochemical cells, the electrode comprising:
   an electrically conductive surface;
   an electrically conductive porous membrane having a first surface and an opposed outer second surface separated from the first surface by a thickness dimension defined by the length of a vector normal to the first surface and extending to where the vector intersects the second surface of an uncompressed portion of membrane wherein the membrane first surface is adjacent the electrically conductive surface and not more than 10% of the membrane second surface includes an area comprising at least one of; being compressed with sufficient sustained force toward the electrically conductive surface and embedded into the electrically conductive surface, so that electrical resistance between a location within a compressed outer second surface and the conducting surface is less than 10 micro-ohm and wherein no point within an uncompressed area is further from a nearest compressed area than three times the defined thickness dimension of the membrane.

2. The electrode for electrochemical cells of claim 1, wherein the electrically conductive porous membrane contains an electrolyte comprising at least one of aqueous acid or alkali, aprotic salt solution, molten carbonate, molten sulfur, gel formulations of solvated ions, any gel, liquid or molten formulation of electrolyte emerging for use in electrochemical cells and any combination thereof.

3. The electrode for electrochemical cells of claim 1, wherein the electrically conductive porous membrane comprises at least one of cohesive nonwoven single and multiwall carbon nanotubes (CNT), single and multiple layers of woven CNT, one and multiple layers of graphene, single and multiple layers of cohesive nonwoven and woven carbon fiber, single and multiple layers of woven and cohesive nonwoven $TiO_2$ nanotubes and nanofiber and combinations thereof.

4. The electrode for electrochemical cells of claim 1, wherein the electrically conductive porous membrane has tensile strength≥2 MPa.

5. The electrode for electrochemical cells of claim 1, wherein the electrically conductive porous membrane is stable at temperatures less than 700 degrees C.

6. The electrode for electrochemical cells of claim 1, wherein at least 15% of the electrically conductive porous membrane is comprised of a plurality of at least one of CNT's and graphene sheets having length dimension greater than three times the thickness dimension of the membrane.

7. The electrode for electrochemical cells of claim 1, wherein the electrically conductive porous membrane is neither cut nor penetrated by at least one of removable embedment tools and sustained compression means.

8. The electrode for electrochemical cells of claim 1, wherein the electrically conductive porous membrane is configured as a pellicle on and combined with the electrically conductive surface, said electrically conductive porous membrane and said electrically conductive surface are porous to 1 centipoise viscosity liquid with greater than 1 Darcy permeability when subjected to normal vector flow.

9. The electrode for electrochemical cells of claim 1, wherein each uncompressed area of the electrically conductive porous membrane has a maximum thickness dimension that does not vary by more than 10% among all uncompressed areas.

10. The electrode for electrochemical cells of claim 1, wherein the thickness of the uncompressed areas of the electrically conductive porous membrane are from about 50 µm to about 1 mm.

11. The electrode for electrochemical cells of claim 1, wherein the electrically conductive porous membrane comprises a plurality of nanoscale surfaces coated with at least one of strongly coupled faradaic material comprising the positive electrode of a secondary battery or supercapacitor, strongly coupled faradaic material comprising the negative electrode of a secondary battery or supercapacitor, strongly coupled catalyst material to reduce oxygen comprising a positive electrode of a fuel cell and strongly coupled catalyst material for oxidizing hydrocarbon fuel or hydrogen comprising a negative electrode of a fuel cell.

12. The electrode for electrochemical cells of claim 11, wherein the electrically conductive porous membrane contains particles enclosable by a sphere of from about 0.5 to about 10 µm diameter that remain lodged and immobilized within the membrane when subject to electrolyte normal vector convective permeation of 1 cm/second.

13. The electrode for electrochemical cells of claim 12, wherein at least one of coatings and particles contained within the electrically conductive porous membrane comprise between 20% and 60% of membrane volume.

14. The electrode for electrochemical cells of claim 1, wherein a plurality of compressed areas are spaced apart to comprise a hexagonal pattern wherein, compression area centers are mutually separated by not more than 3 times the membrane thickness dimension and compression areas are enclosable by a circle of not more than 1.22 times the membrane thickness dimension.

15. The electrode for electrochemical cells of claim 1, wherein a plurality of compressed areas are spaced apart to comprise a square cornered pattern, wherein compression area centers are mutually separated by not more than 4.24 times the membrane thickness dimension; and compression areas are enclosable by a circle of not more than 1.5 times the membrane thickness dimension.

16. The electrode for electrochemical cells of claim 1, wherein a plurality of compressed areas are spaced apart to comprise an equilateral triangular pattern wherein, compression area centers are mutually separated by not more than 5.2 times the membrane thickness dimension and compression areas are enclosable by a circle of not more than 1.73 times the membrane thickness dimension.

17. Two electrodes for a unit cell of an electrochemical cell, the electrodes comprising:
   a positive electrode for electrochemical cells of claim 1; and
   a negative electrode for electrochemical cells of claim 1, wherein respective outer second surfaces of uncompressed membrane positive and negative electrode portions are separated by a gap containing electrolyte; and wherein not more than 10% of respective outer second surfaces of positive and negative electrode membranes are embedded into their respective conductive surfaces.

18. Two electrodes for a unit cell of an electrochemical cell, the electrodes comprising:
   a positive electrode for electrochemical cells of claim 1, and
   a negative electrode for electrochemical cells of claim 1, wherein respective outer second surfaces of uncompressed membrane positive and negative electrode portions are separated by a gap containing electrolyte, and wherein the gap also contains one of an open window dielectric screen separating two square weave metal wire screens with windows of all three screens in axial alignment and a dielectric screen with villiform projections on both sides so that not more than 10% of respective outer second surfaces of positive and negative electrode membranes is compressed against their respective conductive surfaces.

19. Two electrodes for a unit cell of an electrochemical cell of claim 18 wherein conductive surfaces are metal sheets having opposing outer surfaces opposite their respective surfaces adjacent the membrane and the collective layers are placed under compression between respective outer metal surfaces of sufficient magnitude to reduce contact resistance between membrane outer surfaces and metal to less than 10 micro-ohm.

20. Two electrodes for a unit cell of an electrochemical cell of claim 19 wherein the general applied pressure is at least 7,000 Newton/cm$^2$.

21. Two electrodes for a unit cell of an electrochemical cell of claim 17, wherein the real axis impedance of the unit cell is less than $10^{-4}$ ohm-cm$^2$.

22. Two electrodes for a unit cell of an electrochemical cell of claim 17 wherein the real axis impedance of the unit cell is less than $10^{-3}$ ohm-cm$^2$.

\* \* \* \* \*